United States Patent [19]
Araki et al.

[11] Patent Number: 6,101,005
[45] Date of Patent: Aug. 8, 2000

[54] DOCUMENT FEEDER AND IMAGE READER

[75] Inventors: Takao Araki, Kasuga; Yoshihiro Ito, Fukuoka, both of Japan

[73] Assignee: Matsushita Electric Industrial Co., Ltd., Osaka, Japan

[21] Appl. No.: 09/014,089

[22] Filed: Jan. 27, 1998

[30] Foreign Application Priority Data

Jan. 29, 1997 [JP] Japan .................................... 9-014945
Apr. 3, 1997 [JP] Japan .................................... 9-084964

[51] Int. Cl.$^7$ ............................. H04N 1/04; B65H 3/06; B65H 1/08
[52] U.S. Cl. ......................... 358/498; 358/496; 271/126; 271/117
[58] Field of Search .................................... 358/498, 496; 271/126, 127, 153, 154, 155, 117, 118

[56] References Cited

U.S. PATENT DOCUMENTS

| | | | |
|---|---|---|---|
| 4,548,397 | 10/1985 | Riinzi ..................................... | 271/121 |
| 5,412,485 | 5/1995 | Kashiwagi ............................. | 358/498 |
| 5,488,485 | 1/1996 | Amemiya ............................... | 358/498 |
| 5,634,188 | 5/1997 | Johnston et al. ...................... | 271/127 |
| 5,715,071 | 2/1998 | Takashimizu et al. ................. | 358/498 |
| 5,722,653 | 3/1998 | Seidl et al. ............................. | 271/117 |
| 5,732,307 | 3/1998 | Yoshizuka et al. .................... | 271/153 |

*Primary Examiner*—Joseph Mancuso
*Assistant Examiner*—Hien Truong
*Attorney, Agent, or Firm*—Stevens, Davis, Miller & Mosher, L.L.P.

[57] ABSTRACT

A document feeder comprises a hopper table on which documents are to be mounted, a feeding roller for transporting the documents mounted on the hopper table, and lifting system for raising and lowering the hopper table to position the topmost sheet of the documents mounted on the hopper table at a level of the feeding roller. The lifting system includes a hopper motor, and a drive mechanism for raising and lowering the hopper table by means of the driving force. The drive mechanism swings the hopper table when the hopper table is located between an lower limit position and a switching position above the lower limit position, or moves the hopper table vertically with maintaining its posture horizontally when the hopper table is located between the switching position and an upper limit position above the switching position. In addition, the height and the slant angle of the feeding roller sequentially conform to the movement of the hopper table in order to prevent jamming.

8 Claims, 7 Drawing Sheets

DOCUMENT FEEDER AND IMAGE READER

BACKGROUND OF THE INVENTION

1. Field of the Invention

The present invention relates to a document feeder for feeding a document, and an image reader in which such a document feeder is provided.

2. Related Arts

Recently, image readers have come to be widely employed for reading images from documents. For many of these image readers, document feeders are provided for automatically feeding documents to the image readers.

To efficiently read a document, some image readers that are mainly for professional use employ document feeders which can mount a great number (e.g., several hundred or a thousand sheets) of documents at one time on hopper tables.

Generally, a document feeder is required to satisfy the following conditions.

First, a feeding angle at which a document is fed to a feeding roller in an image reader (the same angle as the angle of a hopper table) must not exceed a permissible range for an ideal angle, regardless of the number of documents remaining on the hopper table. This is because if the spread of the feeding angle exceeds the permissible range, paper feeding errors, such as the jamming of documents or that a plurality of sheets are fed at one time, may occur.

Second, the external dimension of the document feeder is small enough to save an installation space.

Third, a power required for raising and lowering a document (on a hopper table) is as small as possible in order to save the electric power consumption and to reduce the size of a drive source.

Conventional document feeders can generally be classified into two types: a parallel lift type and a swing type. In the parallel lift type document feeder, documents are stacked flat in a box-shaped or frame-shaped magazine and are raised and lowered with the magazine in the horizontal state by the action of lifting means, so that the topmost sheet of the documents is fed to the level of a feeding roller.

This structure, however, has the following drawback. A distributed load imposed by the documents affects the magazine. When a large number of documents are mounted, such a distributed load is considerable.

For the parallel lift feeder, two reactive forces that support two ends of the documents against the distributed load must be coped with by the power of the drive source. Further, not only the document but also the magazine must be raised or lowered. Therefore, a drive source that can generate a considerably great power is required. As a result, the size of the document feeder is increased, and a drive source having a large capacity is required, so that the consumption of electric power is increased.

In the swing type document feeder, an end of the hopper table is pivotally mounted on a specific shaft (i.e., is supported rotatably between a convex portion and a concave portion), so that the hopper table can be swung around the rod in accordance with the number of documents mounted on the hopper table.

With this structure, even when a large number of documents are mounted on the hopper table, among the reactive forces related to the distributed load imposed by the documents, the reactive force on the shaft side is coped with by the static reactive force encountered at the rod, and no load is placed on a drive source. Therefore, the required power of the drive source is smaller than that of the parallel lift feeder, and then this is preferable.

However, in order to restrict the angle of the hopper table for this structure within the permissible range, the length of the hopper table (the radius measured from the shaft) must be extended, so that the size of the document feeder is increased. If the length of the hopper table is reduced, the angle through which the hopper table swings must be enlarged so as to handle a large number of documents. As a result, the swing angle of the hopper will exceed the permissible range. Therefore, paper feed errors will occur frequently, and then the image reading efficiency will be drastically reduced.

SUMMARY OF THE INVENTION

It is, therefore, one object of the present invention to provide a document feeder that is compactly made and that can limit the occurrence of paper feed errors, as well as an image reader that employs such a document feeder.

To achieve the object, according to the present invention, provided is a document feeder comprising:

a hopper table on which documents are to be mounted;

paper feeding means having a feeding roller which roller is so supported that the feeding roller contacts a topmost sheet of the documents mounted on the hopper table and feeds the topmost sheet, and that a swing angle of said feeding roller relative to a horizontal plane is changeable;

lifting means for raising and lowering the hopper table and for positioning the topmost sheet of the documents at a level of the paper feeding means; and adjustment means for adjusting the swing angle of the feeding roller, wherein the lifting means includes a drive source for generating a driving force, and a drive mechanism for raising and lowering the hopper table by means of the driving force from the drive source; and wherein the drive mechanism swings the hopper table when the hopper table is located between a lower limit position and a switching position set above the lower position, and moves the hopper table vertically with maintaining its posture horizontally when the hopper table is located between the switching position and an upper limit position set above the switching position; and wherein the adjustment means makes the swing angle of the feeding roller coincide with a slant angle of the hopper table when the hopper table is located between the lower limit position and the switching position, and maintains the feeding roller at a specific position when the hopper table is located between the switching position and the upper limit position.

Furthermore, according to another aspect of the present invention, provided is a document feeder comprising:

a hopper table on which documents are to be mounted;

transportation means for transporting the documents mounted on the hopper table; and lifting means for raising and lowering the hopper table for positioning a topmost sheet of the documents mounted on the hopper table at a level of the transportation means, the lifting means including a drive source for generating a driving force and a drive mechanism for raising and lowering the hopper table by means of the driving force of the drive source, the drive mechanism swinging the hopper table when the hopper table is located between a lower limit position and a switching position above the lower limit position, or moving the hopper table vertically with maintaining its posture horizontally when the hopper table is located between the switching position and an upper limit position above the switching position.

DETAILED DESCRIPTION OF THE PREFERRED EMBODIMENT

An image reader according to the preferred embodiment of the present invention will now be described while referring to the accompanying drawings.

First, an image reader incorporating therein the document feeder according to one embodiment will be explained while referring to FIG. 1. Adjustment means, which will be described later, is omitted from FIGS. 1 to 3 to avoid making the drawings overly complicated.

Figure 1:
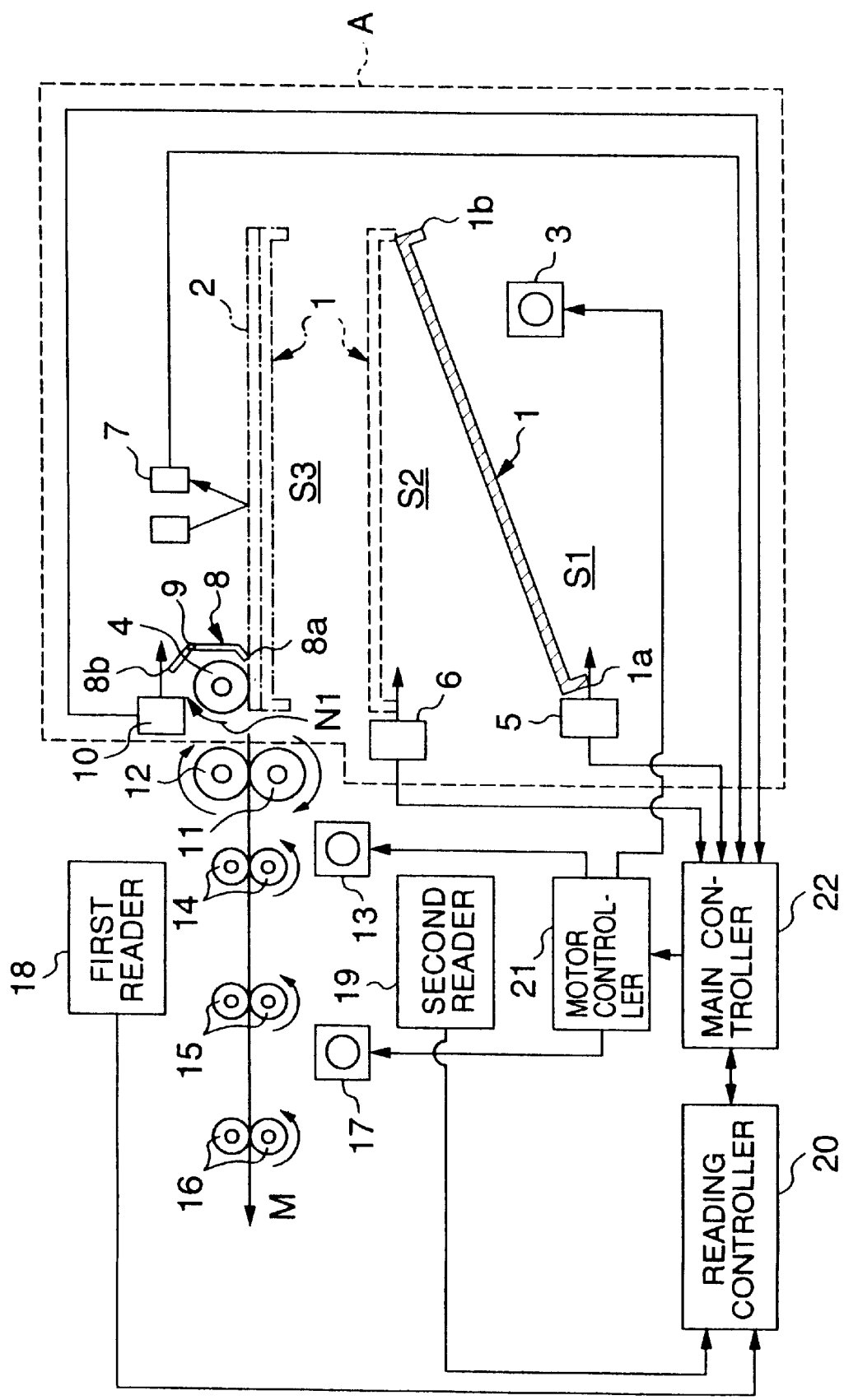
FIG. 1 is a block diagram illustrating an image reader according to one embodiment of the present invention.

As shown in FIG. 1, a document feeder A is provided for the image reader. The document feeder A has a hopper table 1 on which 1 to 1000 documents 2 can be mounted. The hopper table 1 is raised and lowered by lifting means that includes a hopper motor 3 as a drive source, and a drive mechanism described later.

When the maximum number of documents 2 is mounted on the hopper table 1, it is located at a lower limit position S1 indicated by the solid line, in which the hopper table 1 is so inclined that a front edge 1a thereof is directed downward and a rear edge 1b is directed upward. The hopper table 1 is swung upward from the lower limit position S1, and is leveled at a switching position S2 indicated by broken lines. Then, the hopper table 1 is lifted horizontally from the switching position S2 to an upper limit position S3 indicated by chained lines.

The hopper table 1 is moved vertically so that the topmost document 2 is always at a specified level (the level at which it contacts a feeding roller 4). As the individual sheets of the documents 2 on the hopper table 1 are sequentially fed and the number of documents 2 is reduced, the hopper table 1 is gradually lifted from the lower limit position S1 to the switching position S2, and from the switching position S2 to the upper limit position S3.

A lower limit position sensor 5 detects whether or not the hopper table 1 is located at the lower limit position S1, and a switching position sensor 6 detects whether or not the hopper table 1 is located at the switching position S2. A hopper height sensor 7 emits a light directed at a part of the hopper table 1 where no documents 2 are stacked, and employs reflected light to ascertain the height of the hopper table 1.

A feeding roller 4 that serves as paper feeding means rotates in the direction indicated by arrow N1, and feeds the topmost sheet of the documents 2 in the direction indicated by arrow M. A detector 8 is pivoted around a shaft 9, in the vicinity of the feeding roller 4. A lower end 8a of the detector 8 is adapted to contact the topmost sheet of the documents 2, and a document sensor 10 detects an upper end 8b of the detector 8.

If there is even one document sheet 2 on the hopper table 1, the document 2 contacts the lower end 8a and the detector 8 is pivoted around the shaft 9. Thus, the upper end 8b of the detector 8 is not detected by the document sensor 10. In other words, when the upper end 8b of the detector 8 is not detected by the document sensor 10, it is judged that there is at least one document 2 on the hopper table 1.

When there are no documents 2 on the hopper table 1, since the detector 8 does not swing at all, the document senor 10 detects the upper end 8b of the detector 8. That is, the document sensor 120 detects the upper end 8b of the detector 8 to determine whether there are no documents 2 on the hopper table 1. The swing angle and the position of the feeding roller 4 are determined by adjustment means which will be described later.

The image reader is described hereinunder.

A separation roller 12, which rotates forward in the feeding direction M of the documents 2, and a retarder roller 11, which rotates in the reverse direction, are provided directly adjacent to the feeding roller 4 in FIG. 1, and in addition, conveyer rollers 14, 15 and 16 are provided in the feeding direction M. The separation roller 12 and the retarder roller 11 are rotated by a feeding motor 13, and the conveyer rollers 14, 15 and 16 are rotated by a conveyer motor 17.

The obverse surface of the document 2 that is transported in the feeding direction M is read by a first reader 18, and the reverse surface is read by a second reader 19. Image signals from the readers 18 and 19 are digitized by a reading controller 20. The feeding motor 13 and the conveyer motor 17 are driven by a motor controller 21. The above described components are controlled by a main controller 22 that includes a CPU and a RAM, and the digital image data from the reading controller 20 are processed by the main controller 22.

A drive mechanism for the hopper table 1 will now be explained while referring to FIGS. 2 and 3.

Figure 2:
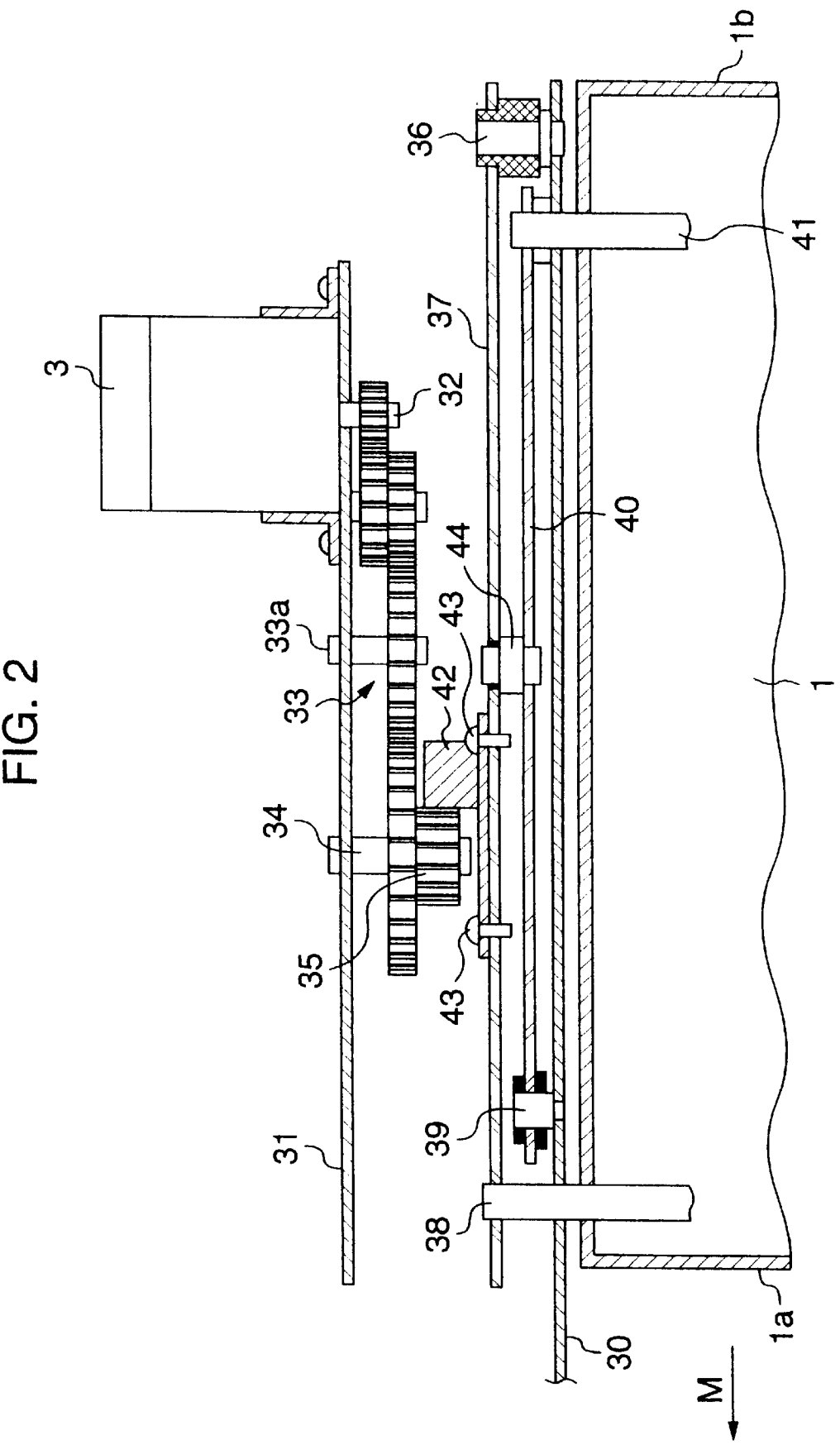
FIG. 2 is a top view of a drive mechanism according to the embodiment of the present invention.

As shown in FIG. 2, the document feeder in this embodiment comprises a fixed chassis 30 and a sub-chassis 31 that is integrally formed with the chassis 30.

A hopper motor 3, such as a pulse motor, is fixed to the sub-chassis 31, and an output shaft 32 of the hopper motor 3 is linked with a series of gears 33, which is fixed to a drive shaft 33a that is rotatably mounted in the sub-chassis 31 through a bearing. The rotational force of the output shaft 32 is transmitted via the series of gears 33 to a pinion 35 that rotates vertically.

The chassis 30, the sub-chassis 31 and the drive mechanism downstream from the gears 33 are also provided on the other side of the hopper table 1, and the driving force is transmitted by the drive shaft 33a. The pinion 35 is pivotally mounted on a shaft 34 and is rotatable relative to the sub-chassis 31.

Figure 3:
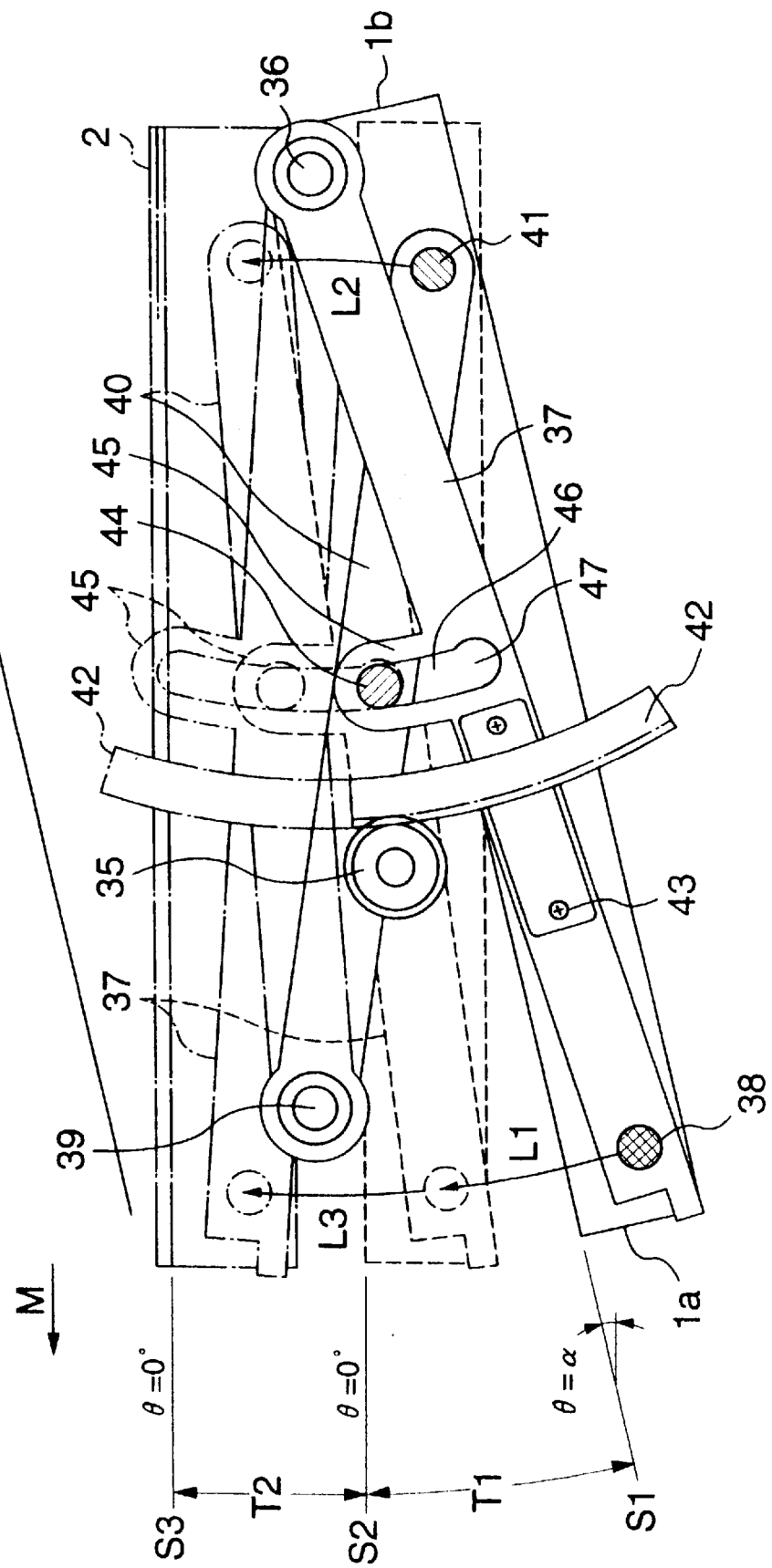
FIG. 3 is a side view of the drive mechanism according to the embodiment of the present invention.

As shown in FIG. 3, one end of a first link 37, which is positioned near a rear edge 1*b* of the hopper table 1, is pivotally mounted on a first fixed support 36 provided in the chassis 30 in FIG. 2. The other end of the first link, which is positioned near a front edge 1*a*, is pivotally mounted to the hopper table 1 through a first shaft 38 at the side of the front edge 1*a* thereof.

The drive mechanism has a second link 40 crossing the first link 37. One end of the second link 40, which is positioned near the front edge 1*a* of the hopper table 1, is pivotally mounted on a second fixed support 39 provided in the chassis 30. The other end of the second link 40, which is positioned near the rear edge 1*b* of the hopper table 1, is pivotally mounted to the hopper table 1 through a second shaft 41 at the side of the rear edge 1*b* thereof.

An elongate protrusion 45 is provided in the middle of the first link 37, and an arc-shaped elongate hole 46, with the first support 36 serving as the center of the arc, is formed in the protrusion 45. A bottom end of the hole 46 serves as a pin seat 47. A connection pin 44 is provided at the middle of the second link 40 to protrude into and slidably engage with the hole 46. An arc-shaped rack 42, with the first support 36 serving as the center of the arc, is secured to the side of the first link 37 by screws 43 and engages the pinion 35.

The operation of the drive mechanism will now be explained while referring to FIG. 3.

When a large number of documents 2 are mounted on the hopper table 1, as is indicated by the solid lines in FIG. 3, the hopper table 1 is located at the lower limit position S1. The upper end of the rack 42 engages the pinion 35, and the connection pin 44 is located at the top end of the elongate hole 46. A slant angle θ of the hopper table 1 falls within a permissible range α.

As the number of documents 2 is reduced by the feeding of sheets, the pinion 35 rotates and the rack 42 is slowly turned. Accordingly, the hopper table 1 swings through the swing area T1 between the lower position S1 and the switching position S2. During this process, the connection pin 44 does not move, while the elongate hole 46 moves upward relative to the connection pin 44. Thus, the second link 40 remains at the position indicated by the solid line, and the driving force received at the pinion 35 is transmitted only to the first link 37, thereby the hopper table 1 merely swings around the first support 36.

When the hopper table 1 reaches the switching position S2, which is indicated by the broken line, the posture of the hopper table 1 is then horizontal. The elongate hole 46 slides upward relative to the connection pin 44, which in turn contacts the pin seat 47 of the elongate hole 46. With this contact, the second link 40 is coupled with the first link 37, and thus the links 37 and 40 cooperate with each other to constitute the parallel linking mechanism. Therefor, the driving force from the pinion 35 is transmitted not only the first link 37 but also to the second link 40.

As a result, when the number of documents 2 is further reduced and the hopper table 1 is raised within a horizontal movement area T2 between the switching position S2 and the upper limit position S3, the horizontal posture of the hopper table 1 is maintained. In the horizonal movement area T2, the hopper table 1 can be raised horizontally.

As described above, in the document feeder according to this embodiment of the present invention, a single linking mechanism serves to swing the hopper table 1 as well as to move it vertically with retaining its horizontal posture. Therefore, an appropriate paper feeding can be performed by a compact mechanism and a small driving force, without increasing the slant angle and the length of the hopper table 1.

Figure 4:
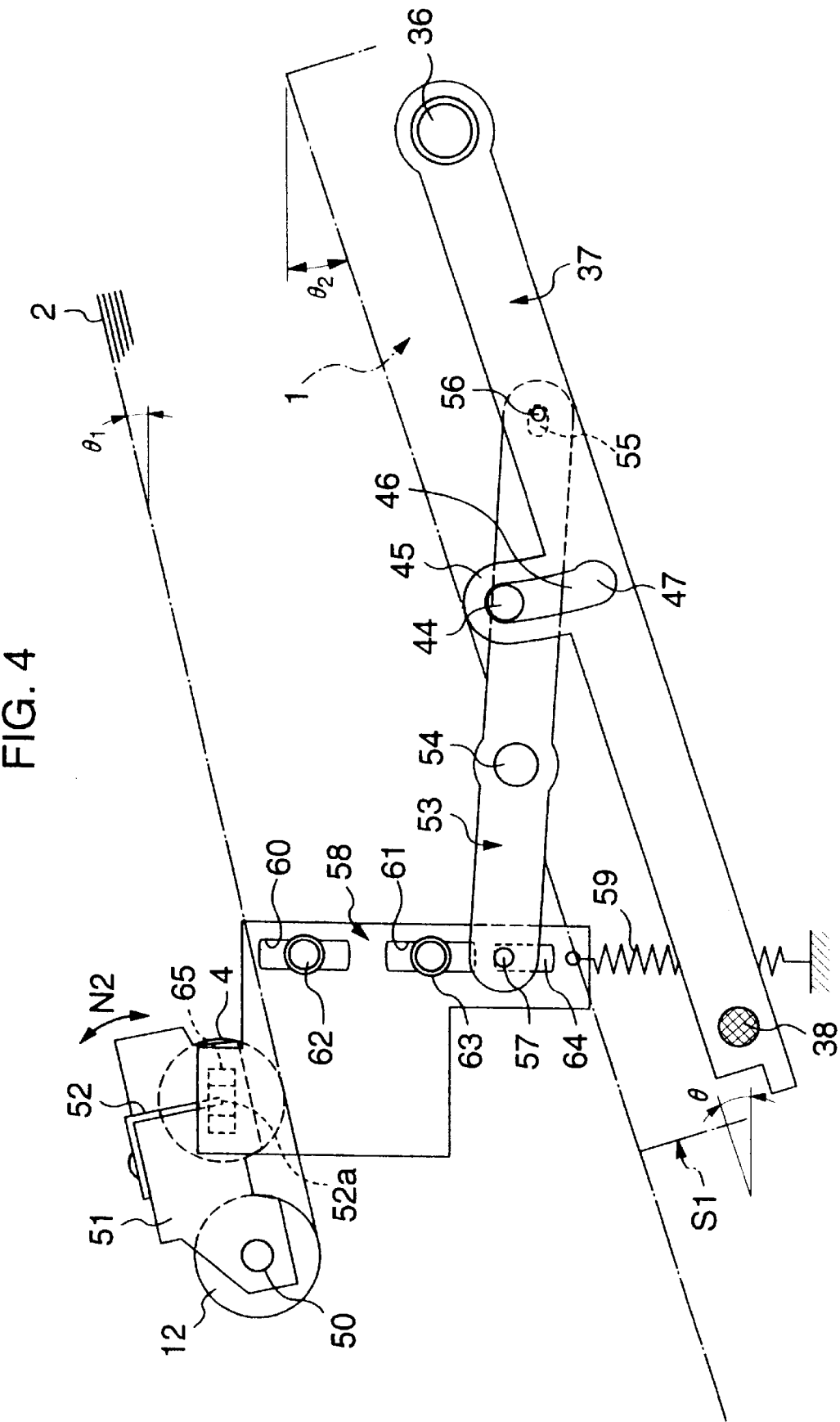
FIG. 4 is a diagram for explaining an operation performed by adjustment means according to the embodiment of the present invention.

The adjustment means will now be described while referring to FIGS. 4, 5 and 6. As shown in FIG. 4, the separation roller 12 rotates around an immobile shaft 50, and the left end of a feeding roller frame 51 is pivoted around the shaft 50 so that it swings in the direction indicated by arrow N2. The feeding roller 4 is rotatably borne at the right end of the feeding roller frame 51. A suspension dog 52 is so fixed to the feeding roller frame 51 that a lower end 52*a* of the dog 52 is positioned at the axis of the feeding roller 4.

At the rear of the first link 37 in FIG. 4, a sensor link 53 is provided for rotating around a fixed support point 54. An elongate hole 55 is formed in the right end of the sensor link 53, and a pin 56 that projects from the side of the first link 37 is loosely inserted into the elongate hole 55, while a pin 57 is projected from the side of the left end of the sensor link 53.

A vertical sensor plate 58 is positioned further to the rear of the sensor link 53 in FIG. 4. The sensor plate 58 is constantly pulled downward by a spring 59. Longitudinal elongate holes 60 and 61 are formed in the sensor plate 58, and slidably receive fixed stoppers 62 and 63, respectively. Guided by these elongate holes 60 and 61 and the stoppers 62 and 63, the sensor plate 58 can move vertically within a specified range. In addition, a longitudinal elongate hole 64 is formed in the sensor plate 58 below the elongate hole 61, and a pin 57 slidably engages with the elongate hole 64.

A dog sensor 65, which is a light transmission sensor, is provided on the upper portion of the sensor plate 58 so that it projects toward the rear of the sheet in FIG. 4. The dog sensor 65 detects the lower end 52*a* of the dog 52. When the hopper table 1 on which are mounted the documents 2 is raised from the lower limit position S1, the topmost document 2 contacts the feeding roller 4. When the hopper table 1 is lifted further, the feeding roller 4 is pushed up and the feeding roller frame 51 and the dog 52 are also turned upward. The hopper table 1 (e.g., the first link 37) is controlled to rise until the lower end 52*a* turns off the dog sensor 65 (until a boundary of the ON/OFF switching).

When the hopper table 1 is located at the lower limit position S1, because there is a large number of documents 2, the hopper table 1, the sensor link 53, the sensor plate 58 and the feeding roller frame 51 are positioned as shown in FIG. 4. That is, although the sensor plate 58 is always pulled downward by the spring 59, the pin 57 is in contact with the upper end of the extended hole 64, and then the sensor plate 58 can not descend any further. The stoppers 62 and 63 are located in the middle of the elongate holes 60 and 61, and do not restrict the movement of the sensor plate 58. In this situation, the swing angle ($\theta_1$) of the feeding roller frame 51 (the same as the inclination of the documents 2) and the slant angle ($\theta_2$) of the face of the hopper table 1 on which the documents 2 are mounted are adapted to coincide with each other ($\theta_1 = \theta_2$).

When the paper feeding is initiated and the topmost document 2 is fed into the device, the feeding roller 4 descends a distance that is equivalent to the thickness of the document 2, and the swing angle of the feeding roller frame 51 is reduced ($\theta_1 \rightarrow \theta_1'$). At the same time, the dog 52 descends to turn on the dog sensor 65. Upon the detection of this, the hopper motor 3 is driven to raise the hopper table 1. When the slant angle θ of the first link 37 is reduced as the hopper table 1 is lifted, the pin 56 is slightly elevated at the support 54, and the pin 57 is lowered slightly. Accordingly, the dog sensor 65 (the sensor plate 58) is lowered slightly and moved to a position where the swing angle ($\theta_1'$) of the feeding roller frame 51 coincides with the slant angle ($\theta_2'$) of the hopper table 1.

Figure 5:
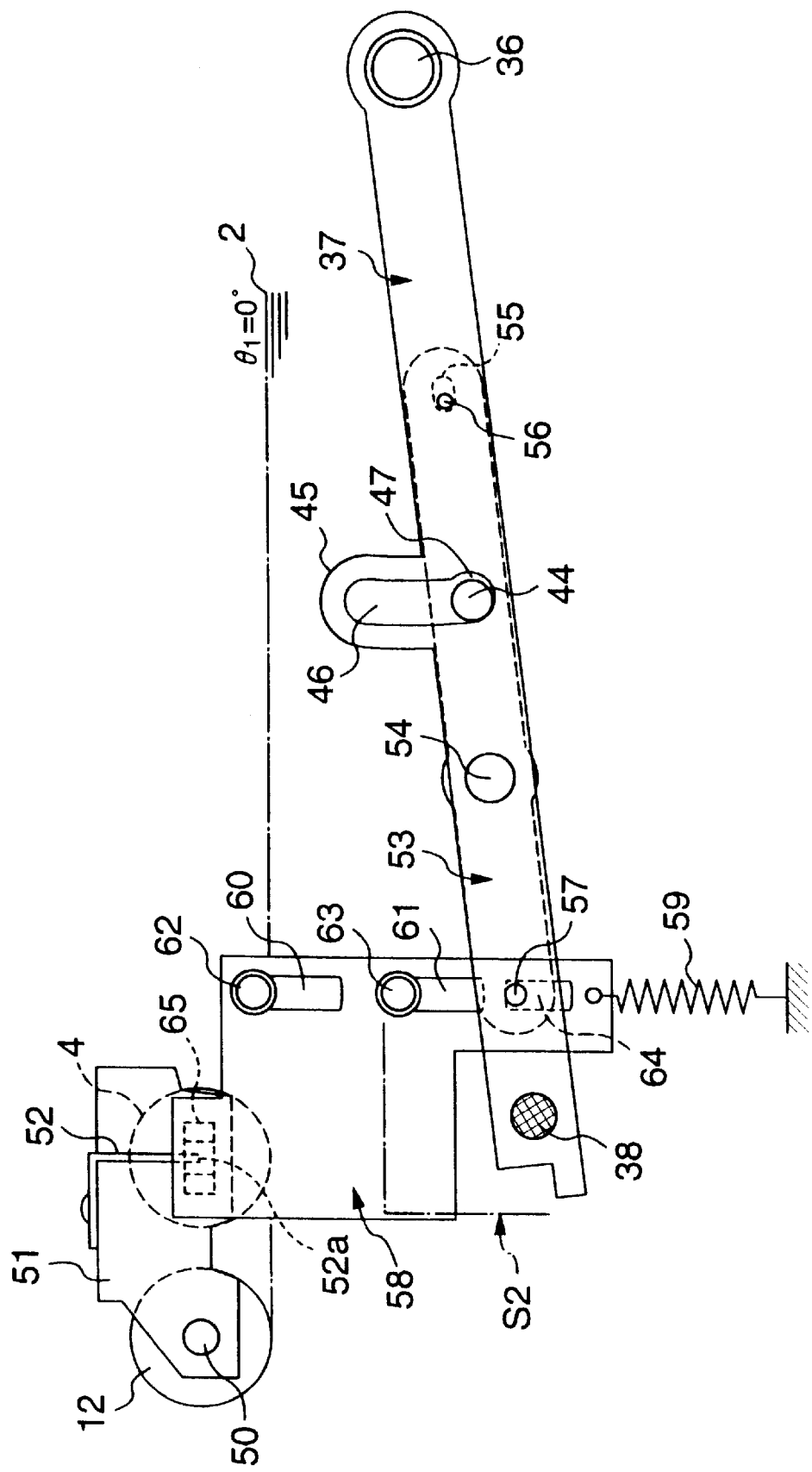
FIG. 5 is a diagram for explaining the operation performed by the adjustment means according to the embodiment of the present invention.

As shown in FIG. 5, when the hopper table 1 reaches the switching position S2, the first link 37 acts as a part of the parallel linking mechanism, and the hopper table 1 is lifted with remaining its posture horizontally.

In connection with the adjustment means, apparent from the comparison between FIG. 4 with FIG. 5, the upper ends of the holes 60 and 61 are gradually lowered to contact the stoppers 62 and 63, respectively and then the descent of the sensor plate 58 is inhibited. The swing angle ($\theta_1$) of the feeding roller frame 51 is zero, and the feeding roller 4 rotates at the same level as does the separation roller 12, thereby feeding the document 2.

Figure 6:
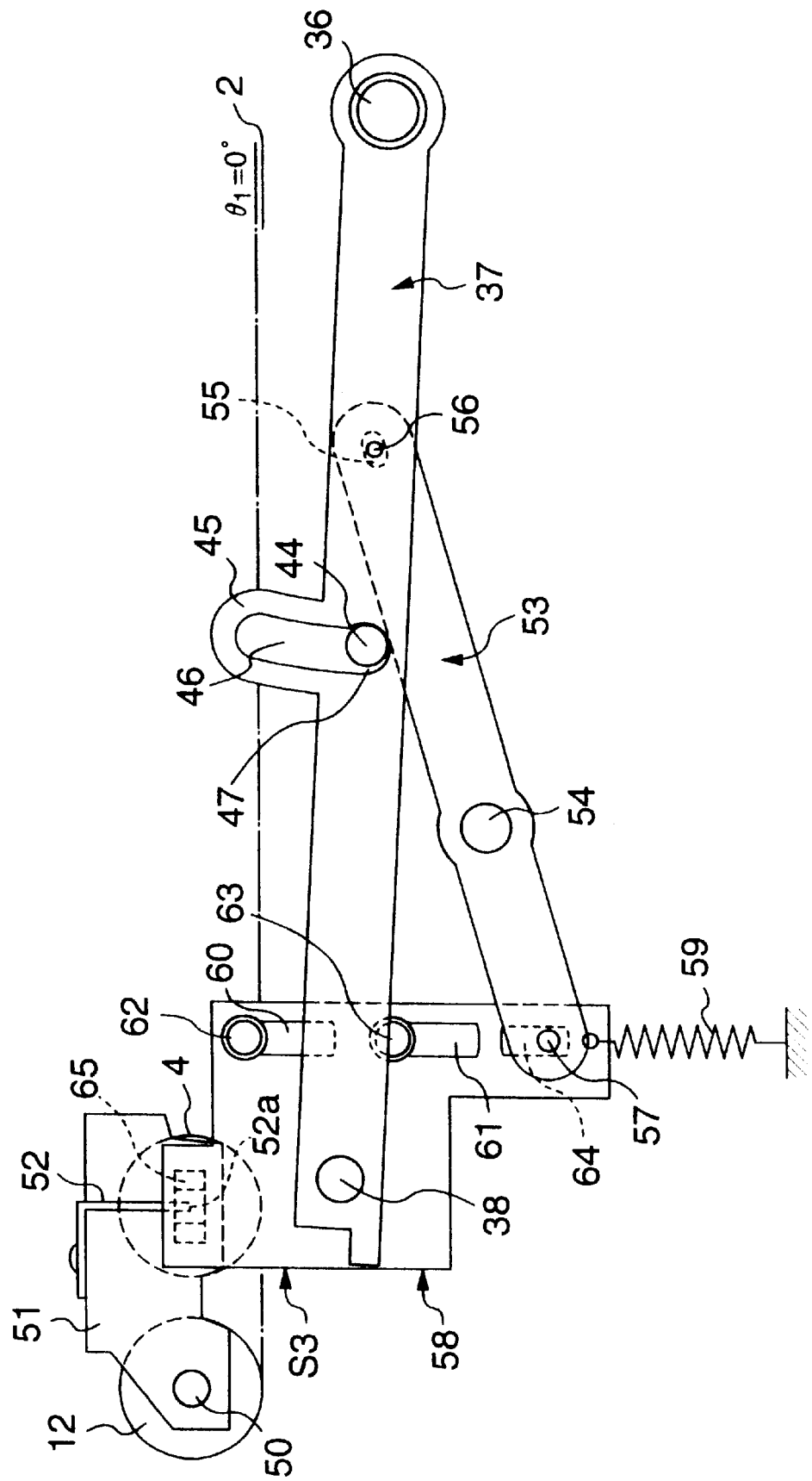
FIG. 6 is a diagram for explaining the operation performed by the adjustment means according to the embodiment of the present invention.

As the document feeding is continued and the hopper table 1 approaches near the upper limit position S3, the positional relationship shown in FIG. 6 is obtained. That is, while the sensor plate 58 is maintained at a specific position because its descent is inhibited, the pin 57 is moved downward from the position in FIG. 5 as the first link 37 is swung. However, since in the state shown in FIG. 5 the pin 57 contacts the upper end of the longitudinal elongate hole 64 and a space for further movement of the pin 57 is ensured, the support 54 and the first link 57 can be swung with no trouble.

As described above, according to the adjustment means in this embodiment, even when the hopper table 1 carries out a swing motion and a level lift motion sequentially by means of a drive mechanism, the feeding roller 4 can smoothly follow the movement of the hopper table 1 and can constantly maintain the appropriate posture for the hopper table 1. Thus, feeding errors, such as paper jamming, can be prevented.

As described above, in this embodiment, the adjustment means is constructed by employing a mechanical structure, but another structure may be employed. For example, an encoder may be used to measure the slant angle of the first link 37, and based on the measured angle, an electronic operation is performed to adjust the swing angle of the feeding roller 4.

The operation of the document feeder according to this embodiment will now be described while referring to FIG. 7.

The document feeder in this embodiment can handle a large number (about 1000 sheets) of documents 2, as described above. However, a large number of documents 2 is not always mounted on the hopper table 1, and in some case, only a small number of documents 2 may be positioned on the hopper table 1. When, as shown by the solid line in FIG. 3, the hopper table 1 is always moved from the lower limit position S1, regardless of the number of documents 2, time is wasted before the topmost document 2 reaches a predetermined level.

In this embodiment, the raising start height of the hopper table 1 is set to Hx, so that not only the lower limit position S1 but also the switching position S2 can be selected. Thus, the saving in the time for raising the hopper table 1 is realized and the work efficiency can be increased.

Figure 7:
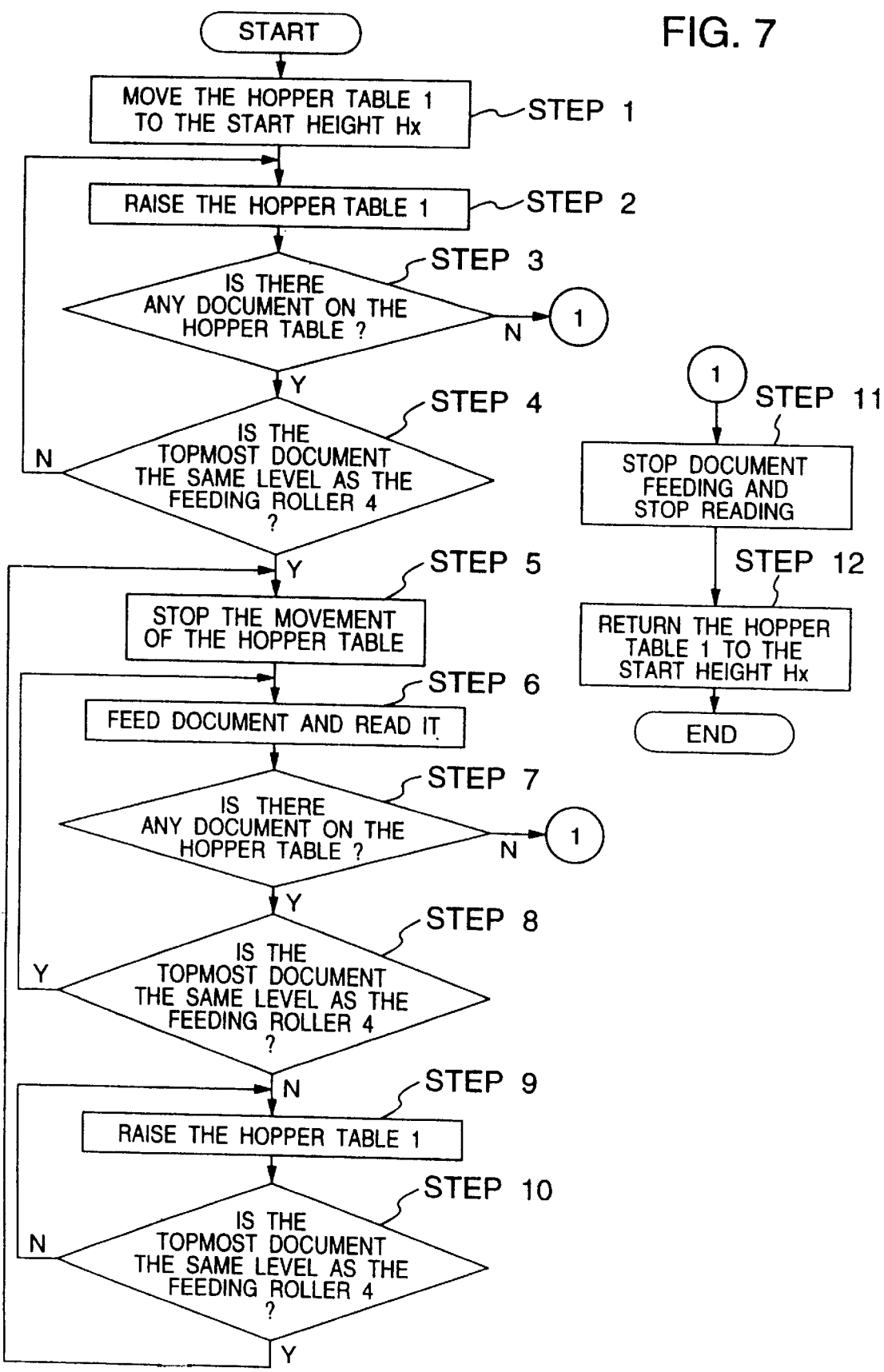
FIG. 7 is a flowchart for a control of a document feeder according to the embodiment of the present invention.

In FIG. 7, first, the above described lifting start height Hx is determined and the hopper table 1 is set at this height (step 1). The main controller 22 outputs command signals to the motor controller 21 so as to drive the hopper motor 3, thereby raising the hopper table 1 (Step 2). The main controller 22 checks the output of the document sensor 10 to determine whether or not there is any document 2 on the hopper table 1 (Step 3). If the document 2 is present, it is confirmed in a Step 4 whether or not the topmost document 2 is flush with the feeding roller 4. If "Yes", the process proceeds to a Step 5. If "No", the process back to the Step 2. The hopper table 1 is further raised until the topmost document 2 reaches the same level of the feeding roller 4, namely, until the lower end 52a of the dog 52 turns off the dog sensor 65.

The main controller 22 dose not need to monitor the hopper table 1 to determine whether it is currently in the area T1 or in the area T2. This is because the drive mechanism can move the hopper table 1 appropriately without any assistance of the main controller 22.

When the topmost document 2 reaches the level of the feeding roller 4, the movement of the hopper table 1 is stopped. The main controller 22 outputs command signals to the reading controller 20 and the motor controller 21, respectively so as to drive the readers 18 and 19, and the feeding motor 13 and the conveyer motor 17. Accordingly, the documents 2 fed from the feeding roller 4 are conveyed one by one in the conveying direction M by means of a set of the separation roller 12 and the retarder roller 11, and the readers 18 and 19 read the obverse and reverse surfaces of the document 2 (Step 6).

The above described processes are repeated until there is no document on the hopper table 1 (Steps 5–10). If no documents 2 is detected (Steps 3 and 7), the process proceeds to a Step 11 in which the document feeding/reading is stopped. The main controller 22 outputs command signals to the reading controller 20 and the motor controller 21, respectively so as to make the readers 18 and 19 inoperative, and to stop the feeding motor 13 and the conveyer motor 17. Subsequently, the main controller 22 further outputs command signals to the motor controller 21 to drive the hopper motor 3, thereby moving down the hopper table 1 to the start height Hx (Step 12).

According to the present invention, since the swinging motion of the hopper table is changed into the horizontal raising motion of the hopper table without discontinuity, even when a large number of documents is mounted on the hopper table, a driving force required for moving the hopper table and a required hopper table size are small, so that the device can be made compactly. In addition, when the slant angle and the height of the hopper table are sequentially changed, an adequate positional relationship for the feeding roller can be maintained, and the occurrence of feeding errors can be limited.

What is claimed is:

1. A document feeder comprising:

a hopper table on which documents are to be mounted;

paper feeding means comprising a feeding roller for contacting and feeding a topmost sheet of said documents mounted on said hopper table;

lifting means for raising and lowering said hopper table and for positioning said topmost sheet of said documents at a level of said paper feeding means; and adjustment means for adjusting a swing angle of said feeding roller, relative to a horizontal plane, wherein said lifting means includes a drive source for generating a driving force, and a drive mechanism for raising and lowering said hopper table by means of said driving force of said drive source; and wherein said drive mechanism swings said hopper table at a variable slant angle relative to said horizontal plane when said hopper table is located between a lower limit position and a switching position set above said lower position, and said drive mechanism moves said hopper table vertically while maintaining its posture horizontally when said hopper table is located between said switching position and an upper limit position set above said switching position; and wherein said adjustment means makes said swing angle of said feeding roller coincide with said slant angle of said hopper table when said hopper table is located between said lower limit position and said switching position, and maintains said feeding roller at a given position when said hopper table is located between said switching position and said upper limit position.

2. An image reader comprising:

a document feeder according to claim 1;

conveyer rollers for conveying a document from said document feeder; and a reading portion for reading said document from said conveyer rollers.

3. An image reader according to claim 2, wherein said reading portion includes a first reader for reading an obverse surface of the document and a second reader for reading a reverse surface of said document.

4. A document feeder comprising:

a hopper table on which documents are to be mounted;

transportation means for transporting said documents mounted on said hopper table; and lifting means for raising and lowering said hopper table for positioning a topmost sheet of said documents mounted on said hopper table at a level of said transportation means, said lifting means including a drive source for generating a driving force and a drive mechanism for raising and lowering said hopper table by means of said driving force from said drive source, said drive mechanism swinging said hopper table at a variable slant angle relative to a horizontal plane when said hopper table is located between a lower limit position and a switching position above said lower limit position, and moving said hopper table vertically while maintaining its posture horizontally when said hopper table is located between said switching position and an upper limit position above said switching position.

5. A document feeder according to claim 4, wherein said drive mechanism includes:

a first link, one end of which, disposed at a rear end side of said hopper table, is pivotally supported by a first fixed support and the other end of which is supported by a first shaft on a front end side of said hopper table, and to which link said driving force is transmitted from said drive source as a force for swinging said first link around said first support; and a second link, one end of which, disposed at the front end side of said hopper table, is pivotally supported by a second fixed support and the other end of which is supported by said second shaft on the rear end of said hopper table, wherein a connection pin that projects from said second link slidably engages a longitudinal elongate hole formed in the middle of said first link;

wherein, when said hopper table is located between said lower limit position and said switching position, said connection pin slides along said elongate hole and only said swinging force of said first link is transmitted to said hopper table; and wherein, when said hopper table is located between said switching position and said upper limit position, said connection pin contacts a pin seat at the bottom of said elongate hole, so that said first link and said second link constitute a parallel linking mechanism to transmit, to said hopper table, said swinging force of said first link as a horizontal raising/lowering force.

6. An image reader comprising:

a document feeder according to claim 4;

conveyer rollers for conveying a document from said document feeder; and a reading portion for reading the document from said conveyer rollers.

7. An image reader according to claim 6, wherein said reading portion includes a first reader for reading an obverse surface of the document and a second reader for reading the reverse surface of said document.

8. An image reader comprising:

a document feeder according to claim 5;

conveyer rollers for conveying a document from said document feeder; and a reading portion for reading the document from said conveyer rollers.

* * * * *